US012655607B2

(12) United States Patent
Ono et al.

(10) Patent No.: US 12,655,607 B2
(45) Date of Patent: Jun. 16, 2026

(54) DRIVE CONTROL DEVICE FOR ROTATING WORK MACHINE AND ROTATING WORK MACHINE PROVIDED WITH SAME

(71) Applicant: KOBELCO CONSTRUCTION MACHINERY CO., LTD., Hiroshima (JP)

(72) Inventors: Yohei Ono, Hiroshima (JP); Yuichiro Fujita, Hiroshima (JP); Masahiro Kawamoto, Hiroshima (JP); Natsuki Yumoto, Hiroshima (JP); Kazushige Koiwai, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 18/860,925

(22) PCT Filed: Apr. 28, 2023

(86) PCT No.: PCT/JP2023/016894
§ 371 (c)(1),
(2) Date: Oct. 28, 2024

(87) PCT Pub. No.: WO2023/219015
PCT Pub. Date: Nov. 16, 2023

(65) Prior Publication Data

US 2025/0297454 A1 Sep. 25, 2025

(30) Foreign Application Priority Data

May 10, 2022 (JP) ................................ 2022-077698

(51) Int. Cl.
*E02F 9/12* (2006.01)
*E02F 9/20* (2006.01)
(Continued)

(52) U.S. Cl.
CPC ........... *E02F 9/123* (2013.01); *E02F 9/2004* (2013.01); *E02F 9/2203* (2013.01);
(Continued)

(58) Field of Classification Search
CPC ........... F15B 11/162; F15B 2211/7135; F15B 2211/78; E02F 9/2037
See application file for complete search history.

(56) References Cited

U.S. PATENT DOCUMENTS 4,875,337 A * 10/1989 Sugiyama ............ E02F 9/2239 414/730
6,430,922 B2 * 8/2002 Tohji .................... E02F 9/2296 60/421
(Continued)

FOREIGN PATENT DOCUMENTS

EP 1 672 128 A2 6/2006
JP 11-199178 A 7/1999
(Continued)

OTHER PUBLICATIONS

Extended European Search Report issued Jun. 16, 2025, in corresponding European Patent Application No. 23803493.8, 7 pages.
(Continued)

*Primary Examiner* — Thomas E Lazo
(74) *Attorney, Agent, or Firm* — Oblon, McClelland, Maier & Neustadt, L.L.P.

(57) ABSTRACT

A drive control apparatus for a slewing-type working machine includes: a compensation control valve between a hydraulic pump and a first actuator that has an adjustable opening degree for changing a flow rate of hydraulic oil to be supplied from the hydraulic pump to the first actuator; a slewing manipulation device that receives a slewing manipulation for actuating a slewing motor; a first manipulation device that receives a first manipulation for actuating
(Continued)

the first actuator; and a controller that adjusts, during a combined manipulation of the first manipulation and the slewing manipulation, the opening degree of the compensation control valve to cause an actual slewing acceleration to reach a target slewing acceleration according to a manipulation amount of the slewing manipulation.

4 Claims, 6 Drawing Sheets

(51) Int. Cl.
*E02F 9/22* (2006.01)
*F15B 13/02* (2006.01)
*F15B 15/18* (2006.01)

(52) U.S. Cl.
CPC .......... *E02F 9/2292* (2013.01); *E02F 9/2296* (2013.01); *F15B 13/026* (2013.01); *F15B 15/18* (2013.01); *E02F 9/2285* (2013.01)

(56) References Cited

U.S. PATENT DOCUMENTS

| | | | | |
|---|---|---|---|---|
| 7,921,764 | B2 * | 4/2011 | Takeshita | E02F 9/2225 91/513 |
| 2006/0179691 | A1 * | 8/2006 | Kim | E02F 9/2296 37/414 |
| 2007/0204606 | A1 | 9/2007 | Imanishi et al. | |
| 2014/0303855 | A1 | 10/2014 | Umeda et al. | |
| 2016/0356020 | A1 | 12/2016 | Cho | |
| 2020/0362538 | A1 * | 11/2020 | Kozui | E02F 9/128 |
| 2021/0156109 | A1 * | 5/2021 | Kondo | E02F 9/22 |
| 2021/0285185 | A1 | 9/2021 | Shirato et al. | |
| 2022/0002965 | A1 * | 1/2022 | Misaki | E02F 9/2285 |

FOREIGN PATENT DOCUMENTS

| | | | |
|---|---|---|---|
| JP | 2001-165107 | A | 6/2001 |
| JP | 2005-325911 | A | 11/2005 |
| JP | 4434159 | B2 | 3/2010 |
| JP | 2013-224724 | A | 10/2013 |
| JP | 5886323 | B2 | 3/2016 |
| JP | 2017-57643 | A | 3/2017 |
| JP | 2019-27261 | A | 2/2019 |
| JP | 2019-65956 | A | 4/2019 |
| JP | 111287251 | A | 6/2020 |

OTHER PUBLICATIONS

International Search Report issued Jun. 20, 2023 in PCT/JP2023/016894 filed Apr. 28, 2023, 2 pages.

* cited by examiner

DRIVE CONTROL DEVICE FOR ROTATING WORK MACHINE AND ROTATING WORK MACHINE PROVIDED WITH SAME

TECHNICAL FIELD

The present disclosure relates to a drive control apparatus for a slewing-type working machine such as a hydraulic excavator.

BACKGROUND ART

Typically, a slewing-type working machine includes a lower traveling body, an upper slewing body slewably supported by the lower traveling body, a working device attached to the upper slewing body, a slewing motor that is a hydraulic motor to slew the upper slewing body, a hydraulic pump to discharge hydraulic oil to be supplied to the slewing motor, and a slewing control valve between the hydraulic pump and the slewing motor. The slewing control valve is opened and closed according to a slewing lever manipulation by an operator to change a flow rate of hydraulic oil to be supplied to the slewing motor, which is a part of the hydraulic oil discharged from the hydraulic pump. In many cases, the hydraulic oil discharged by the hydraulic pump is utilized not only for the slewing motor but also for another hydraulic actuator (e.g., a boom cylinder). In the cases, the other hydraulic actuator is connected with the hydraulic pump via a control valve independent of the slewing control valve. In other words, the hydraulic pump is utilized for both supply of the hydraulic oil to the slewing motor and supply of the hydraulic oil to the hydraulic actuator.

Although a high slewing torque is required to increase a lower slewing speed of the upper slewing body, a combined manipulation for simultaneously actuating the slewing motor and the other hydraulic actuator in the case as described above where the hydraulic pump is utilized for both may result in a low slewing torque due to a low actuation pressure for the other hydraulic actuator. Hereinafter, this is referred to as hydraulic interference.

Patent Literature 1 discloses a slewing-type working machine configured to appropriately distribute hydraulic oil to a slewing motor and another hydraulic actuator. The slewing-type working machine limits an actuator flow rate (a flow rate of hydraulic oil to be supplied to the hydraulic actuator) with a high limitation degree while the slewing speed of the upper slewing body is low, and reduces the limitation degree for the actuator flow rate while the slewing speed is high to thereby reduce a pressure loss resulting from the limitation on the actuator flow rate, so that highly efficient operation can be performed.

For improvement of operability during the combined manipulation, it is desirable to perform a slewing movement at an acceleration according to an amount of a manipulation given to a manipulation device by an operator. In the slewing-type working machine of Patent Literature 1, however, the acceleration of the slewing movement during the combined manipulation changes according to the actuation pressure for the hydraulic actuator; therefore, further improvement is expected.

CITATION LIST

Patent Literature

Patent Literature 1: Japanese Unexamined Patent Publication No. 2019-27261

SUMMARY OF INVENTION

An object of the present disclosure is to provide a drive control apparatus for a slewing-type working machine that enables adjustment of a slewing acceleration to a target slewing acceleration according to a manipulation amount of a slewing manipulation even in a case where a hydraulic pump is utilized for both a slewing motor and another hydraulic actuator and a combined manipulation for actuating the actuators is performed.

Provided is a drive control apparatus for a slewing-type working machine that includes: a hydraulic pump; a slewing motor that slews an upper slewing body supporting a working device having a first movable part; a first actuator that moves the first movable part; a slewing control valve between the hydraulic pump and the slewing motor that has an adjustable opening degree for changing a flow rate of hydraulic oil to be supplied from the hydraulic pump to the slewing motor; a compensation control valve between the hydraulic pump and the first actuator that has an adjustable opening degree for changing a flow rate of hydraulic oil to be supplied from the hydraulic pump to the first actuator; a slewing manipulation device that receives a slewing manipulation for actuating the slewing motor; a first manipulation device that receives a first manipulation for actuating the first actuator; and a controller that adjusts, during a combined manipulation of the first manipulation and the slewing manipulation, the opening degree of the compensation control valve to cause an actual slewing acceleration to reach a target slewing acceleration according to a manipulation amount of the slewing manipulation.

DESCRIPTION OF EMBODIMENTS

Hereinafter, an embodiment of the present disclosure will be described with reference to the drawings.

Figure 1:
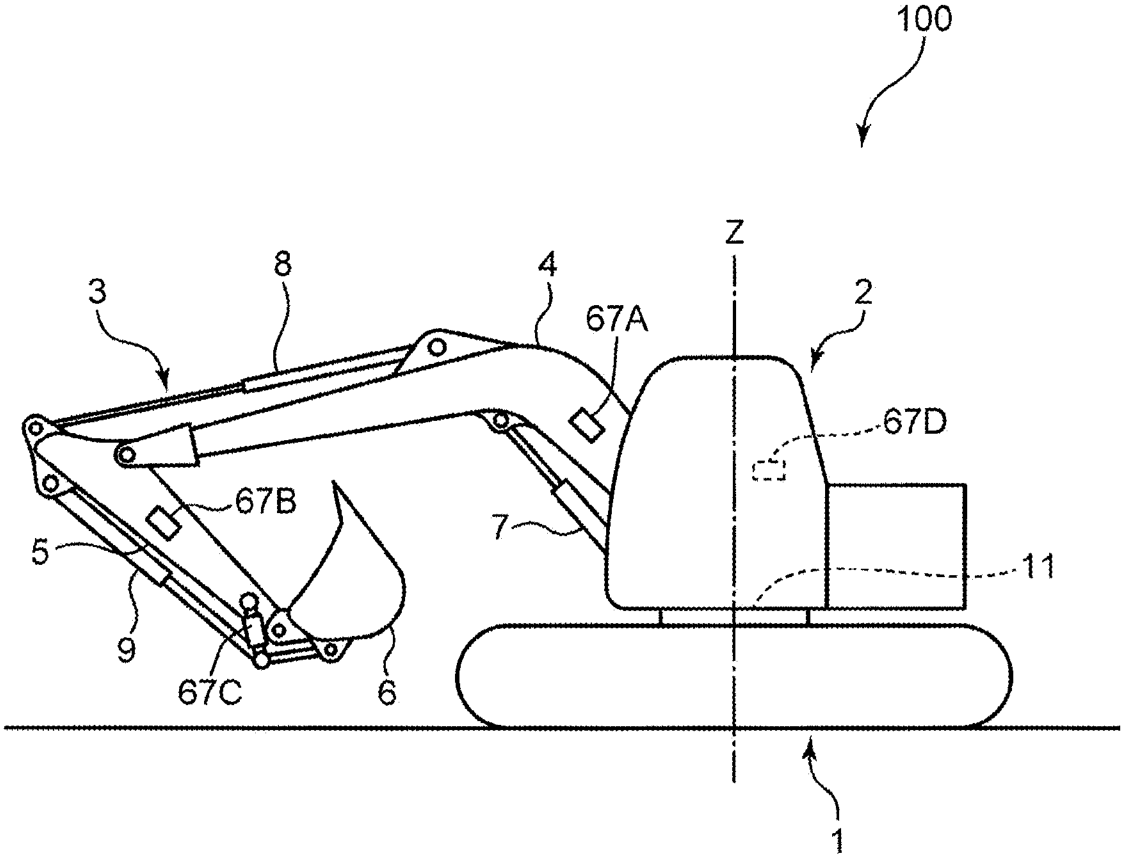
FIG. 1 is a side view of a slewing-type working machine including a drive control apparatus according to an embodiment of the present disclosure.
Figure 2:
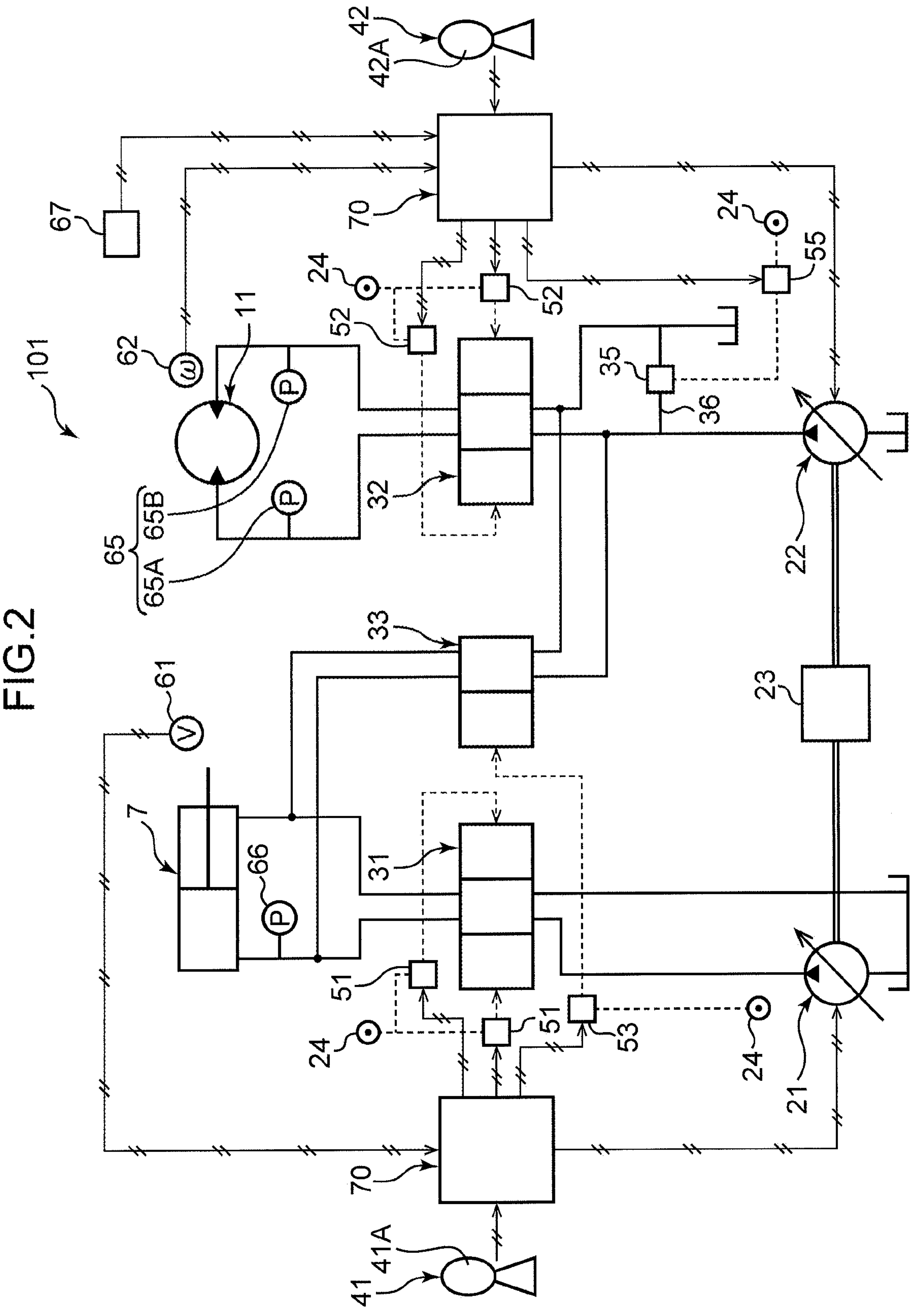
FIG. 2 is a diagram of the drive control apparatus according to the embodiment.

A slewing-type working machine 100 shown in FIG. 1 is a hydraulic excavator. As shown in FIGS. 1 and 2, the slewing-type working machine 100 includes a lower traveling body 1, an upper slewing body 2, a working device 3, a plurality of pumps, a plurality of actuators, a plurality of control valves, a plurality of manipulation devices, a plurality of proportional valves, a plurality of detectors, and a controller 70.

The lower traveling body 1 includes a pair of right and left crawler traveling devices and a lower frame supported by the crawler traveling devices. The upper slewing body 2 is supported by the lower traveling body 1 slewably around a slewing axis Z. The slewing axis Z is an axis extending in a vertical direction. The upper slewing body 2 includes an upper frame supported by the lower frame and a cabin supported on a front portion of the upper frame. The upper slewing body 2 includes a machine chamber that contains a drive source 23 (see FIG. 2) such as an engine.

The working device 3 includes a boom 4 tiltably supported on the upper slewing body 2, an arm 5 rotatably supported on the boom 4, and a bucket 6 rotatably supported on the arm 5. The boom 4 has a boom proximal end rotatably attached to the upper frame of the upper slewing body 2 and a boom distal end opposite to the boom proximal end. The arm 5 has an arm proximal end rotatably attached to the boom distal end and an arm distal end opposite to the arm proximal end. The bucket 6 has a bucket proximal end rotatably attached to the arm distal end. In the embodiment, the boom 4 exemplifies a first movable part.

Each of the pumps is driven by the drive source 23 (e.g. an engine) to discharge hydraulic oil. As shown in FIGS. 1 and 2, the pumps include a first pump 21, a second pump 22, and a pilot pump 24. Each of the first pump 21 and the second pump 22 is a variable displacement hydraulic pump capable of changing its capacity according to a capacity instruction from the controller 70. Specifically, each of the first pump 21 and the second pump 22 includes, e.g., an unillustrated regulator for capacity control; when the capacity instruction from the controller 70 is input to the regulator, a tilt angle is changed according to the capacity instruction, so that the capacity (displacement volume) is changed and a discharge amount of the hydraulic oil is changed. The pilot pump 24 provides pilot pressure to each of the control valves. The second pump 22 exemplifies a hydraulic pump in the present disclosure, and the first pump 21 exemplifies another hydraulic pump independent of the second pump 22.

The actuators include a boom cylinder 7, an arm cylinder 8, a bucket cylinder 9, and a slewing motor 11. As shown in FIG. 2, the boom cylinder 7 is a hydraulic cylinder actuated by supply of the hydraulic oil discharged from the first pump 21. The boom cylinder 7 has a head chamber and a rod chamber. The boom cylinder 7 exemplifies a first actuator. The slewing motor 11 is a hydraulic motor actuated by supply of the hydraulic oil discharged from the second pump 22. The slewing motor 11 has a pair of ports.

The arm cylinder 8 and the bucket cylinder 9 are not illustrated in FIG. 2. The arm cylinder 8 is a hydraulic cylinder actuated by supply of the hydraulic oil discharged from one of the first pump 21 and the second pump 22. The bucket cylinder 9 is a hydraulic cylinder actuated by supply of the hydraulic oil discharged from one of the first pump 21 and the second pump 22.

As shown in FIG. 2, the control valves include a boom control valve 31, a slewing control valve 32, a compensation control valve 33, an arm control valve (not shown), and a bucket control valve (not shown). Each of the boom control valve 31, the slewing control valve 32, the arm control valve, and the bucket control valve may be, e.g., a three-position pilot selector valve having a spool and a pair of pilot ports to receive pilot pressure from the pilot pump 24. The compensation control valve 33 may be, e.g., a two-position selector valve having a spool and a pilot port.

The boom control valve 31 is between the first pump 21 and the boom cylinder 7, and is configured to have an adjustable opening degree for allowing supply of the hydraulic oil discharged from the first pump 21 to the boom cylinder 7. In other words, the boom control valve 31 is opened and closed to change a direction and a flow rate of the hydraulic oil to be supplied from the first pump 21 to the boom cylinder 7. The pair of pilot ports of the boom control valve 31 includes a boom raising pilot port and a boom lowering pilot port. The boom control valve 31 exemplifies a first control valve.

The slewing control valve 32 is between the second pump 22 and the slewing motor 11, and is configured to have an adjustable opening degree for allowing supply of the hydraulic oil discharged from the second pump 22 to the slewing motor 11. In other words, the slewing control valve 32 is opened and closed to change a direction and a flow rate of the hydraulic oil to be supplied from the second pump 22 to the slewing motor 11. The pair of pilot ports of the slewing control valve 32 includes a rightward slewing pilot port and a leftward slewing pilot port.

The compensation control valve 33 is between the second pump 22 and the boom cylinder 7, and is configured to have an adjustable opening degree for allowing supply of the hydraulic oil discharged from the second pump 22 to the boom cylinder 7. In other words, the compensation control valve 33 is opened and closed to change a flow rate of the hydraulic oil to be supplied from the second pump 22 to the boom cylinder 7. Specifically, the compensation control valve 33 is opened and closed to allow supply of the hydraulic oil discharged from the second pump 22 to the head chamber of the boom cylinder 7 in a case where a boom manipulation device 41 described later receives a boom manipulation (e.g., a boom raising manipulation described later). Thus, the boom cylinder 7 is supplied with the hydraulic oil from both of the first pump 21 and the second pump 22, and therefore the speed of the boom cylinder 7 is ensured even in a high-load movement such as a boom raising movement.

In the embodiment, the compensation control valve 33 compensates an acceleration of movement of the slewing motor 11 during a combined manipulation in which the boom manipulation and a slewing manipulation described later are simultaneously performed. The compensation of the acceleration will be described later.

The arm control valve is between one pump of the first pump 21 and the second pump and the arm cylinder 8, and is configured to have an adjustable opening degree for allowing supply of the hydraulic oil discharged from the pump to the arm cylinder 8. In other words, the arm control valve is opened and closed to change a direction and a flow rate of the hydraulic oil to be supplied from the pump to the arm cylinder 8.

The bucket control valve is between one pump of the first pump 21 and the second pump 22 and the bucket cylinder 9, and is configured to have an adjustable opening degree for allowing supply of the hydraulic oil discharged from the pump to the bucket cylinder 9. In other words, the bucket control valve is opened and closed to change a direction and a flow rate of the hydraulic oil to be supplied from the pump to the bucket cylinder 9.

The manipulation devices include a boom manipulation device 41 (see FIG. 2) to receive the boom manipulation for actuating the boom cylinder 7, a slewing manipulation device 42 (see FIG. 2) to receive a slewing manipulation for actuating the slewing motor 11, an arm manipulation device (not shown) to receive an arm manipulation for actuating the arm cylinder 8, and a bucket manipulation device (not shown) to receive a bucket manipulation for actuating the bucket cylinder 9. The boom manipulation device 41 exemplifies a first manipulation device.

Each of the manipulation devices has a manipulation lever capable of receiving a manipulation by the operator. One manipulation lever may be used for two manipulation devices. Each of the manipulation devices is an electric lever device to output a manipulation signal that is an electrical signal corresponding to a direction for a manipulation given by the operator to the manipulation lever and a lever manipulation amount of the manipulation. The manipulation signal output by each of the manipulation devices is input to the controller 70. More details will be described below.

The boom manipulation device 41 has a boom manipulation lever 41A capable of receiving a boom raising manipulation for causing the boom 4 to perform a boom raising movement and a boom lowering manipulation for causing the boom 4 to perform a boom lowering movement. The boom raising movement is such a movement of the boom 4 that the boom distal end of the boom 4 moves away from ground. The boom lowering movement is such a movement of the boom 4 that the boom distal end of the boom 4 approaches the ground. When the boom manipulation lever 41A receives the boom raising manipulation, the boom manipulation device 41 inputs to the controller 70 a boom raising manipulation signal corresponding to a lever manipulation amount of the boom raising manipulation. When the boom manipulation lever 41A receives the boom lowering manipulation, the boom manipulation device 41 inputs to the controller 70 a boom lowering manipulation signal corresponding to a lever manipulation amount of the boom lowering manipulation.

The slewing manipulation device 42 has a slewing manipulation lever 42A capable of receiving a rightward slewing manipulation for causing the upper slewing body 2 to perform a rightward slewing movement and a leftward slewing manipulation for causing the upper slewing body 2 to perform a leftward slewing movement. When the slewing manipulation lever 42A receives the rightward slewing manipulation, the slewing manipulation device 42 inputs to the controller 70 a slewing manipulation signal (rightward slewing manipulation signal) corresponding to a lever manipulation amount of the rightward slewing manipulation. When the slewing manipulation lever 42A receives the leftward slewing manipulation, the slewing manipulation device 42 inputs to the controller 70 a slewing manipulation signal (leftward slewing manipulation signal) corresponding to a lever manipulation amount of the leftward slewing manipulation.

The arm manipulation device is capable of receiving an arm pulling manipulation for causing the arm 5 to perform an arm pulling movement and an arm pushing manipulation for causing the arm 5 to perform an arm pushing movement. The arm pulling movement is such a movement of the arm 5 that the arm distal end of the arm 5 approaches the boom 4. The arm pushing movement is such a movement of the arm 5 that the arm distal end of the arm 5 moves away from the boom 4. When receiving the arm pulling manipulation, the arm manipulation device inputs to the controller 70 an arm pulling manipulation signal corresponding to a lever manipulation amount of the arm pulling manipulation. When receiving the arm pushing manipulation, the arm manipulation device inputs to the controller 70 an arm pushing manipulation signal corresponding to a lever manipulation amount of the arm pushing manipulation. The description of a basic configuration and function of the bucket manipulation device, which are similar to those of the boom manipulation device 41 and the arm manipulation device, will be omitted.

Each of the proportional valves is between the pilot pump 24 and one of the pilot ports of one of the control valves. Each of the proportional valves reduces pressure of pressure oil from the pilot pump 24 to generate outlet pressure according to a control instruction that is input from the controller 70, and the outlet pressure from each of the proportional valves is provided to the pilot port of the corresponding control valve. Each of the proportional valves is, e.g., a solenoid proportional valve. The proportional valves include a pair of boom proportional valves 51, 51, a pair of slewing proportional valves 52, 52, and a compensation proportional valve 53.

The pair of boom proportional valves 51, 51 includes a boom raising proportional valve 51 between the pilot pump 24 and the boom raising pilot port of the boom control valve 31 and a boom lowering proportional valve 51 between the pilot pump 24 and the boom lowering pilot port of the boom control valve 31.

The boom manipulation device 41 inputs the boom raising manipulation signal to the controller 70 when receiving the boom raising manipulation, and the controller 70 inputs a boom raising control instruction to the boom raising proportional valve 51. The boom raising proportional valve 51 generates pilot pressure being outlet pressure according to the boom raising control instruction, and the generated pilot pressure is provided to the boom raising pilot port of the boom control valve 31. The spool of the boom control valve 31 shifts from a neutral position in a direction corresponding to the boom raising manipulation by a shift amount corresponding to the provided pilot pressure, and the opening degree of the boom control valve 31 is adjusted to a magnitude corresponding to the shift amount. Thus, the boom control valve 31 allows supply of the hydraulic oil discharged from the first pump 21 to the head chamber of the boom cylinder 7 at a flow rate corresponding to the shift amount, and allows discharge and return of the hydraulic oil from the rod chamber of the boom cylinder 7 to a tank. Consequently, the boom cylinder 7 is actuated in an expansion direction so that the boom 4 performs the boom raising movement.

The boom manipulation device 41 inputs the boom lowering manipulation signal to the controller 70 when receiving the boom lowering manipulation, and the controller 70 inputs a boom lowering control instruction to the boom lowering proportional valve 51. The boom lowering proportional valve 51 generates pilot pressure being outlet pressure according to the boom lowering control instruction, and the generated pilot pressure is provided to the boom lowering pilot port of the boom control valve 31. The spool of the boom control valve 31 shifts from a neutral position in a direction corresponding to the boom lowering manipulation by a shift amount corresponding to the provided pilot pressure, and the opening degree of the boom control valve 31 is adjusted to a magnitude corresponding to the shift amount. Thus, the boom control valve 31 allows supply of the hydraulic oil discharged from the first pump 21 to the rod chamber of the boom cylinder 7 at a flow rate corresponding to the shift amount, and allows discharge and return of the hydraulic oil from the head chamber of the boom cylinder 7 to the tank. Consequently, the boom cylinder 7 is actuated in a contraction direction so that the boom 4 performs the boom lowering movement.

The pair of slewing proportional valves 52, 52 includes a rightward slewing proportional valve 52 between the pilot pump 24 and the rightward slewing pilot port of the slewing control valve 32, and a leftward slewing proportional valve 52 between the pilot pump 24 and the leftward slewing pilot port of the slewing control valve 32.

The slewing manipulation device 42 inputs the rightward slewing manipulation signal to the controller 70 when receiving the rightward slewing manipulation, and the controller 70 inputs a rightward slewing control instruction to the rightward slewing proportional valve 52. The rightward slewing proportional valve 52 generates pilot pressure being outlet pressure according to the rightward slewing control instruction, and the generated pilot pressure is provided to the rightward slewing pilot port of the slewing control valve 32. The spool of the slewing control valve 32 shifts from a neutral position in a direction corresponding to the rightward slewing manipulation by a shift amount corresponding to the provided pilot pressure, and the opening degree of the slewing control valve 32 is adjusted to a magnitude corresponding to the shift amount. Thus, the slewing control valve 32 allows supply of the hydraulic oil discharged from the second pump 22 to one port of the slewing motor 11 at a flow rate corresponding to the shift amount, and allows discharge and return of the hydraulic oil from the other port of the slewing motor 11 to a tank. Consequently, the slewing motor 11 moves in a rightward slewing direction so that the upper slewing body 2 performs the rightward slewing movement.

The slewing manipulation device 42 inputs the leftward slewing manipulation signal to the controller 70 when receiving the leftward slewing manipulation, and the controller 70 inputs a leftward slewing control instruction to the leftward slewing proportional valve 52. The leftward slewing proportional valve 52 generates pilot pressure being outlet pressure according to the leftward slewing control instruction, and the generated pilot pressure is provided to the leftward slewing pilot port of the slewing control valve 32. The spool of the slewing control valve 32 shifts from a neutral position in a direction corresponding to the leftward slewing manipulation by a shift amount corresponding to the provided pilot pressure, and the opening degree of the slewing control valve 32 is adjusted to a magnitude corresponding to the shift amount. Thus, the slewing control valve 32 allows supply of the hydraulic oil discharged from the second pump 22 to the other port of the slewing motor 11 at a flow rate corresponding to the shift amount, and allows discharge and return of the hydraulic oil from the one port of the slewing motor 11 to the tank. Consequently, the slewing motor 11 moves in a leftward slewing direction so that the upper slewing body 2 performs the leftward slewing movement.

The compensation proportional valve 53 is between the pilot pump 24 and the pilot port of the compensation control valve 33. The compensation proportional valve 53 is used for the boom raising movement.

The detectors include a boom speed detector 61, a slewing speed detector 62, a differential pressure detector 65, a boom holding pressure detector 66, and a posture detector 67. Each of the detectors inputs a detection signal corresponding to a detection result of a detection to the controller 70.

The boom speed detector 61 detects a movement speed of the boom cylinder 7 or a speed correlating to the movement speed (e.g., movement speed of the boom 4). The slewing speed detector 62 detects a movement speed (e.g., angular velocity) of the slewing motor 11 or a speed correlating to the movement speed (e.g., slewing speed of the upper slewing body 2). The differential pressure detector 65 detects differential pressure in the slewing motor 11. Specifically, the differential pressure detector 65 includes a first pressure sensor 65A that detects one of meter-in pressure and meter-out pressure of the slewing motor 11 and a second pressure sensor 65B that detects the other of the meter-in pressure and the meter-out pressure of the slewing motor 11. The boom holding pressure detector 66 is a pressure sensor that detects pressure in the head chamber of the boom cylinder 7.

The posture detector 67 detects a posture of the working device 3. Specifically, in the embodiment, the posture detector 67 includes a boom posture sensor 67A that detects a posture of the boom 4, an arm posture sensor 67B that detects a posture of the arm 5, and a bucket posture sensor 67C that detects a posture of the bucket 6 (see FIG. 1).

The boom posture sensor 67A is, e.g., a boom angle sensor that detects an angle of the boom 4 with respect to the upper slewing body 2, or may be a boom angle sensor that detects an angle of the boom 4 with respect to a horizontal plane, a stroke sensor that detects a movement of the boom cylinder 7, or another sensor. The boom angle sensor is. e.g., a resolver, a rotary encoder, a potentiometer, or an inertial measurement unit (IMU). The stroke sensor may detect a cylinder length of a hydraulic cylinder, or may detect a position of a piston rod with respect to a cylinder tube.

The arm posture sensor 67B is, e.g., an arm angle sensor that detects an angle of the arm 5 with respect to the boom 4, or may be an arm angle sensor that detects an angle of the arm 5 with respect to the horizontal plane, a stroke sensor that detects a movement of the arm cylinder 8, or another sensor. The bucket posture sensor 67C is, e.g., a bucket angle sensor that detects an angle of the bucket 6 with respect to the arm 5, or may be a bucket angle sensor that detects an angle of the bucket 6 with respect to the horizontal plane, a stroke sensor that detects a movement of the bucket cylinder 9, or another sensor. As the arm angle sensor and the bucket angle sensor, devices similar to those described above as the boom angle sensor can be used.

The posture detector 67 may further include a slewing body posture sensor 67D (see FIG. 1). The slewing body posture sensor 67D is a sensor that detects a posture of the upper slewing body 2. The slewing body posture sensor 67D may be, e.g., a sensor that detects an inclination (posture) of the upper slewing body 2 with respect to the horizontal plane. Alternatively, the slewing body posture sensor 67D may be, e.g., a slewing angle sensor that detects an angle of the upper slewing body 2 with respect to the lower traveling body 1, a gyro sensor that detects an angular velocity (slewing angular velocity) of the upper slewing body 2 with respect to the lower traveling body 1, or another sensor.

The controller 70 includes a processing unit such as a CPU and an MPU, and a memory. The controller 70 controls a movement of the slewing-type working machine 100 on the basis of the detection signals input from the detectors. In FIG. 2, the controller 70 is depicted as being at two places for convenience, but this does not indicate that the controller 70 is composed of two units. The controller 70 may be constituted by a single controller, or may include a plurality of controllers.

The slewing-type working machine 100 includes a drive control apparatus 101 according to the embodiment. The drive control apparatus 101 shown in FIG. 2 includes the first pump 21, the second pump 22, the boom cylinder 7, the slewing motor 11, the boom manipulation device 41, the slewing manipulation device 42, the slewing control valve 32, the compensation control valve 33, and the controller 70. The controller 70 adjusts the opening degree of the compensation control valve 33 to cause an actual slewing acceleration being a slewing acceleration at a certain time to reach a target slewing acceleration that is a target of the slewing acceleration, when a predetermined combined manipulation is performed. In the embodiment, a control to compensate the slewing acceleration is executed for a combined manipulation including the boom manipulation (e.g., boom raising manipulation) and the slewing manipulation. The boom manipulation exemplifies a first manipulation in the present disclosure. The slewing manipulation is the rightward slewing manipulation or the leftward slewing manipulation.

Figure 3:
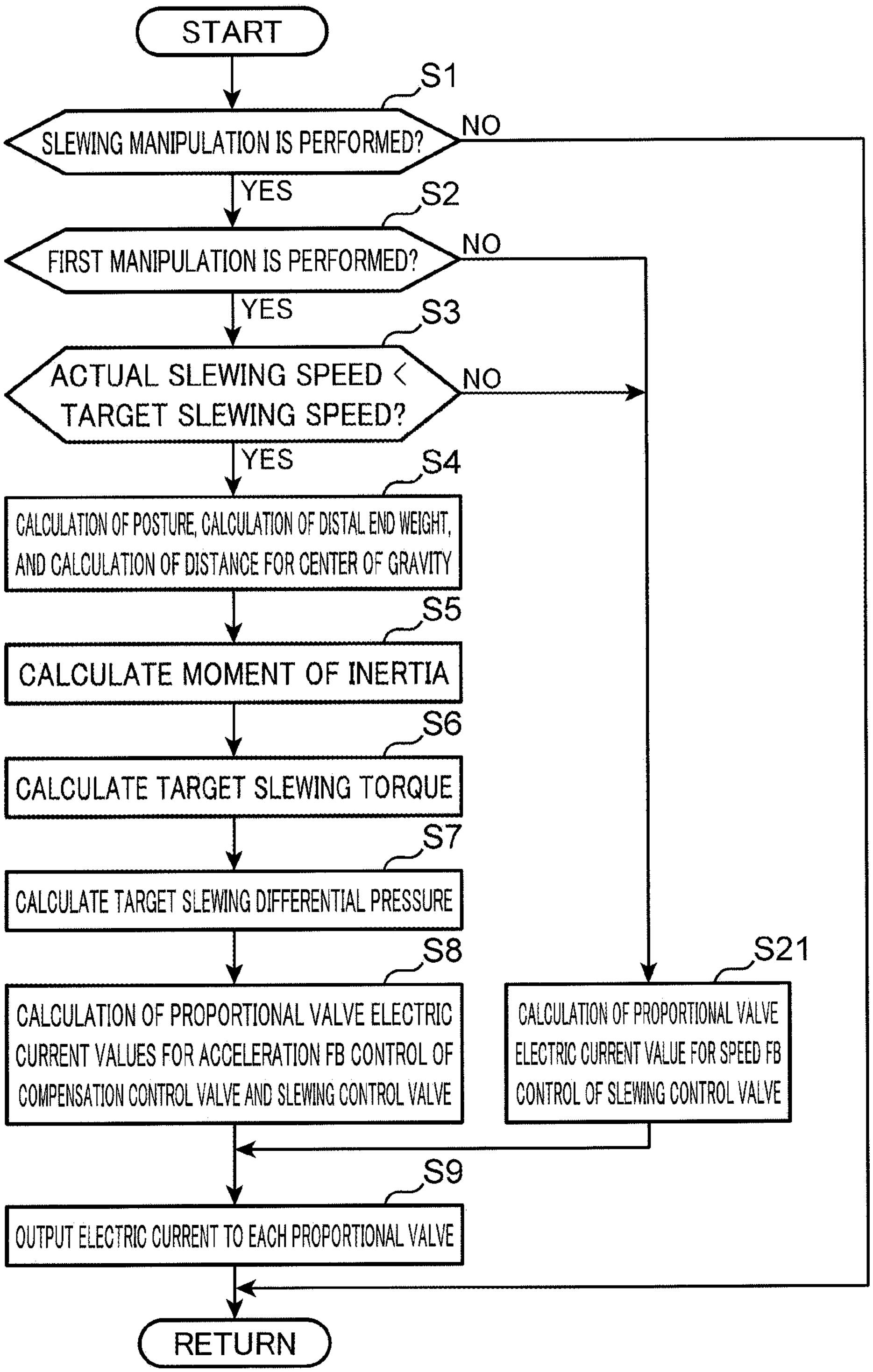
FIG. 3 is a flowchart illustrating an exemplary calculation process executed by a controller of the drive control apparatus according to the embodiment.

FIG. 3 is a flowchart illustrating an exemplary calculation process executed by the controller 70 of the drive control apparatus 101 according to the embodiment.

The controller 70 determines whether the slewing manipulation device 42 receives a slewing manipulation (Step S1). In a case where the slewing manipulation device 42 receives the slewing manipulation (YES in Step S1), the controller 70 proceeds to Step S2 and subsequent steps; in a case where the slewing manipulation device 42 receives no slewing manipulation (NO in Step S1), the controller 70 does not proceed to Step S2 and subsequent steps.

In the case where the slewing manipulation device 42 receives the slewing manipulation, the controller 70 determines whether the boom manipulation device 41 receives a boom manipulation (exemplary first manipulation) (Step S2). In the embodiment, the boom manipulation as the first manipulation is the boom raising manipulation. In a case where the boom manipulation device 41 receives the boom manipulation (YES in Step S2), i.e., in a case where the combined manipulation predetermined in the embodiment is performed, the controller 70 proceeds to Step S3 and subsequent steps; in a case where the boom manipulation device 41 receives no boom manipulation (NO in Step S2), i.e., in a case where the combined manipulation is not performed, the controller 70 proceeds to Step S21.

The controller 70 can execute the determination in Step S1, e.g., in a manner as follows. When the manipulation lever 42A of the slewing manipulation device 42 receives a slewing manipulation by the operator, the slewing manipulation device 42 inputs a slewing manipulation signal corresponding to a direction of the slewing manipulation and a lever manipulation amount of the slewing manipulation to the controller 70, so that the controller 70 can determine on the basis of the input slewing manipulation signal that the slewing manipulation device 42 receives the slewing manipulation. On the other hand, the controller 70 can determine that the slewing manipulation device 42 receives no slewing manipulation in a case where no slewing manipulation signal is input to the controller 70.

The controller 70 can execute the determination in Step S2, e.g., in a manner as follows. When the manipulation lever 41A of the boom manipulation device 41 receives a boom manipulation (e.g., boom raising manipulation) by the operator, the boom manipulation device 41 inputs a boom manipulation signal corresponding to a direction of the boom manipulation and a lever manipulation amount of the boom manipulation to the controller 70, so that the controller 70 can determine on the basis of the input boom manipulation signal that the boom manipulation device 41 receives the boom manipulation. On the other hand, the controller 70 can determine that the boom manipulation device 41 receives no boom manipulation in a case where no boom manipulation signal is input to the controller 70.

In the case where the combined manipulation is performed (YES in Step S2), the controller 70 determines whether a necessity determining condition as follows is fulfilled. The necessity determining condition includes a condition for determining whether to execute a slewing acceleration feedback control (slewing acceleration FB control) for compensating the acceleration of the movement of the slewing motor 11. In the embodiment, the necessity determining condition is that an actual slewing speed being a slewing speed at a certain time is lower than a target slewing speed that is a target of the slewing speed. In other words, in the embodiment, the controller 70 determines whether the actual slewing speed is lower than the target slewing speed to determine whether to execute the slewing acceleration FB control (Step S3). The necessity determining condition is not limited to this specific example. For example, the necessity determining condition is that the actual slewing speed is lower than a preset reference value; in this case, the reference value is set to be smaller than, e.g., the target slewing speed. The necessity determining condition may be another condition that allows the determination of the necessity of executing the slewing acceleration FB control.

In a case where the actual slewing speed is not lower than the target slewing speed (NO in Step S3), the controller 70 executes a slewing speed feedback control (slewing speed FB control) including a procedure of Steps S21 and S9 without executing the slewing acceleration FB control because it is not necessary to accelerate the movement of the slewing motor 11. On the other hand, in a case where the actual slewing speed is lower than the target slewing speed (YES in Step S3), the controller 70 executes the slewing acceleration FB control including a procedure of Steps S4 to S9 in order to compensate the acceleration of the movement of the slewing motor 11. In many cases, the rotation body being a body including the upper slewing body 2 and the working device 3 is accelerated when the actual slewing speed is lower than the target slewing speed; therefore, the necessity determining condition as described above is used in Step S3.

Figure 4:
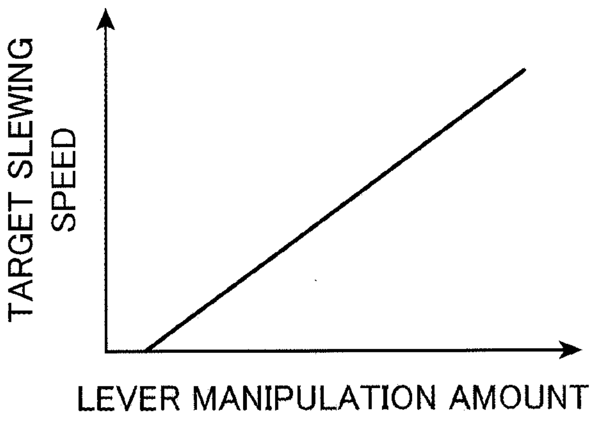
FIG. 4 is an exemplary map used for the calculation process, represented as a graph indicating a relationship between a lever manipulation amount of a slewing manipulation and a target slewing speed.

The controller 70 can execute the determination in Step S3, e.g., in a manner as follows. The controller 70 prestores a map indicating a relationship between the target slewing speed and the lever manipulation amount of the slewing manipulation received by the slewing manipulation lever 42A of the slewing manipulation device 42. FIG. 4 is a graph representing an example of the map. The controller 70 determines a target slewing speed on the basis of a lever manipulation amount of a slewing manipulation at a certain time and the map. The controller 70 acquires an actual slewing speed at the certain time on the basis of a detection signal input from the slewing speed detector 62. The controller 70 then compares the determined target slewing speed and the acquired actual slewing speed, and thus can determine whether the actual slewing speed is lower than the target slewing speed.

In the case where the actual slewing speed is not lower than the target slewing speed (NO in Step S3), the controller 70 executes the slewing speed FB control including Steps S21 and S9 without executing the slewing acceleration FB control. In the slewing speed FB control, the controller 70 adjusts the opening degree of the slewing control valve 32 to cause the actual slewing speed to reach the target slewing speed. In other words, the controller 70 executes a feedback control for adjusting the opening degree of the slewing control valve 32 to cause a slewing speed error that is an error between the target slewing speed and the actual slewing speed to approach zero. Thus, the movement speed of the slewing motor 11 is compensated. Specifically, in the slewing speed FB control, the controller 70 determines a slewing control instruction (an electric current value) being a control instruction to the slewing proportional valve 52 such that the slewing speed error approaches zero (Step S21), and inputs the slewing control instruction to the slewing proportional valve 52 (Step S9). As forms of the feedback control, for example, PID control, PI control, and P control are available. In PID control, the controller 70 may calculate the slewing control instruction by using, e.g., the following equation.

$$u(t) = Kp \times e(t) + Ki\int e(t)dt + Kd\big(de(t)/dt\big)$$

In the equation above, "u" denotes the slewing control instruction, "Kp", "Ki", and "Kd" denote a proportional gain, an integral gain, and a derivative gain (PID gains), respectively, and "e" denotes the slewing speed error. The PID gains are preset for the slewing speed FB control and stored in the controller 70.

On the other hand, in the case where the actual slewing speed is lower than the target slewing speed (YES in Step S3), the controller 70 executes the slewing acceleration FB control including Steps S4 to S9. In the slewing acceleration FB control, first, the controller 70 calculates a moment of inertia of the rotation body around the slewing axis Z (vehicle body slewing axis) (Steps S4 and S5). Specifically, the controller 70 calculates the posture of the working device 3, a distal end weight, and a distance for a combined center of gravity (Step S4), and calculates the moment of inertia by using results of these calculations (Step S5).

The distal end weight is a total of a weight of the bucket 6 and a weight of a held object that is held by the bucket 6, e.g., soil and sand. The distance for the combined center of gravity is a distance between the slewing axis Z and the combined center of gravity. The combined center of gravity is a center of gravity resulting from a combination of a center of gravity of the upper slewing body 2 and a center of gravity of the working device 3. The weight of the held object held by the bucket 6 such as soil and sand correlates to the pressure in the head chamber of the boom cylinder 7 detected by the boom holding pressure detector 66 and the posture of the working device 3. Therefore, the controller 70 can calculate the distal end weight by using the calculated weight of the held object and the prestored weight of the bucket 6.

The moment of inertia of the rotation body around the slewing axis Z is calculated, e.g., in a manner as follows.

The controller 70 calculates the posture of the working device 3 on the basis of a detection signal input from the posture detector 67. The controller 70 can acquire a posture of the boom 4 (e.g., an angle of the boom 4 with respect to the upper slewing body 2) on the basis of a detection signal input from the boom posture sensor 67A, a posture of the arm 5 (e.g., an angle of the arm 5 with respect to the boom 4) on the basis of a detection signal input from the arm posture sensor 67B, and a posture of the bucket 6 (e.g., an angle of the bucket 6 with respect to the arm 5) on the basis of a detection signal input from the bucket posture sensor 67C. The controller 70 can geometrically calculate the posture of the working device 3 by using information on the postures of the boom 4, the arm 5, and the bucket 6 (e.g., the angle of the boom 4, the angle of the arm 5, and the angle of the bucket 6). In this regard, the controller 70 may acquire an inclination of the upper slewing body 2 with respect to the horizontal plane (the posture of the upper slewing body 2) on the basis of a detection signal input from the slewing body posture sensor 67D and take the acquired posture of the upper slewing body 2 into account additionally to calculate the posture of the working device 3. In this case, the posture of the working device 3 is calculated more accurately.

A position of the center of gravity of the working device 3 correlates to the posture of the working device 3 and the distal end weight. The controller 70 prestores respective characteristics of the boom 4, the arm 5, and the bucket 6, e.g., respective sizes, weights, and centers of gravity. Therefore, the controller 70 can geometrically calculate the position of the center of gravity of the working device 3 and a weight of the working device 3 for the center of gravity by using the posture of the working device 3 and the distal end weight.

The controller 70 prestores a position of the center of gravity of the upper slewing body 2 and a weight of the upper slewing body 2 for the center of gravity. Therefore, the controller 70 can calculate a position of the combined center of gravity around the slewing axis Z and a weight (m) for the combined center of gravity by combining the center of gravity of the upper slewing body 2 and the center of gravity of the working device 3. The controller 70 can calculate the distance (r) for the combined center of gravity, i.e., the distance between the slewing axis Z and the combined center of gravity, by using the position of the combined center of gravity and the position of the slewing axis Z. Thus, the controller 70 can calculate the moment (I) of inertia by using the distance (r) for the combined center of gravity and the weight (m) for the combined center of gravity ($1=mr^2$).

Next, the controller 70 calculates a target slewing torque (T) (Step S6), specifically, as follows. The target slewing torque (T) is represented by the equation "$T=mr^2\times d\omega/dt$". In the equation, "w" denotes the angular velocity. As described above, the moment (1) of inertia around the slewing axis Z is represented by the equation "$I=mr^2$". Therefore, the controller 70 can calculate the target slewing torque (T) by using the equation "$T=I\times d\omega/dt$". In the equation. "$d\omega/dt$" denotes the target slewing acceleration (target angular acceleration).

Figure 5:
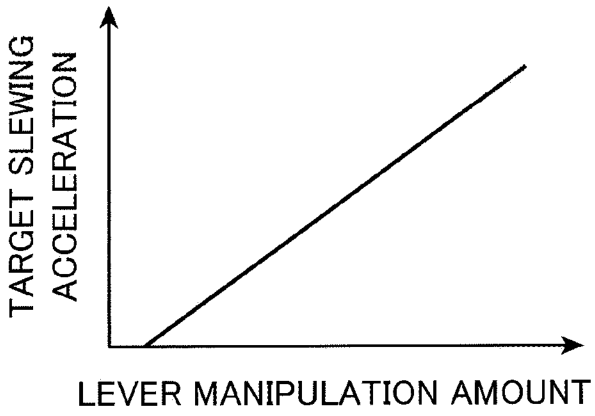
FIG. 5 is an exemplary map used for the calculation process, represented as a graph indicating a relationship between the lever manipulation amount of the slewing manipulation and a target slewing acceleration.

The controller 70 can determine the target slewing acceleration, e.g., in a manner as follows. The controller 70 prestores a map indicating a relationship between the target slewing acceleration and the lever manipulation amount of the slewing manipulation received by the slewing manipulation lever 42A of the slewing manipulation device 42. FIG. 5 is a graph representing an example of the map. The controller 70 determines a target slewing acceleration on the basis of a lever manipulation amount of a slewing manipulation at a certain time and the map. The controller 70 then calculates the target slewing torque (T) by using the target slewing acceleration ($d\omega/dt$) and the moment (1) of inertia.

Next, the controller 70 calculates a target slewing differential pressure (P) (Step S7). The target slewing differential pressure (P) exemplifies a target slewing torque relevant value relevant to the target slewing torque (T). The controller 70 can calculate the target slewing differential pressure (P) by using, e.g., the equation "$P=2\pi\times I/q\times d\omega/dt$". In the equation, the product "$I\times d\omega/dt$" corresponds to the target slewing torque (T) calculated as described above. In the equation, "q" denotes a slewing motor equivalent capacity. The slewing motor equivalent capacity (q) is a motor capacity covering a reduction ratio (q=motor capacity× reduction ratio). In a case where the slewing motor equivalent capacity (q) and the target slewing acceleration ($d\omega/dt$) are constant values, the target slewing differential pressure (P) is proportional to the moment (I) of inertia.

The controller 70 then adjusts the opening degree of the compensation control valve 33 and the opening degree of the slewing control valve 32 to cause an actual slewing differential pressure to reach the target slewing differential pressure (P) (Steps S8 and S9). Specifically, the controller 70 adjusts the opening degree of the compensation control valve 33 to cause a slewing differential pressure error, which is an error between the target slewing differential pressure (P) and the actual slewing differential pressure, to approach zero, and adjusts the opening degree of the slewing control valve 32 to cause the slewing differential pressure error to approach zero. The actual slewing differential pressure exemplifies an actual slewing torque relevant value relevant to an actual slewing torque.

Specifically, in the slewing acceleration FB control, the controller 70 determines a compensation control instruction (an electric current value) being a control instruction to the compensation proportional valve 53 such that the slewing differential pressure error approaches zero (Step S8), and inputs the compensation control instruction to the compensation proportional valve 53 (Step S9). Further, in the slewing acceleration FB control, the controller 70 determines a slewing control instruction (an electric current value) being a control instruction to the slewing proportional valve 52 such that the slewing differential pressure error approaches zero (Step S8), and inputs the slewing control instruction to the slewing proportional valve 52 (Step S9). As forms of each of the feedback controls, for example, PID control, PI control, and P control are available. In PID control, the controller 70 may calculate each of the compensation control instruction and the slewing control instruction by using. e.g., the following equation.

$$u(t) = Kp \times e(t) + Ki\int e(t)dt + Kd(de(t)/dt)$$

In the equation above. "u" denotes the compensation control instruction or the slewing control instruction, "Kp", "Ki", and "Kd" denote a proportional gain, an integral gain, and a derivative gain (PID gains), respectively, and "e" denotes the slewing differential pressure error. The PID gains for calculating the compensation control instruction and the PID gains for calculating the slewing control instruction are separately preset for the slewing acceleration FB control, and stored in the controller 70.

The controller 70 iteratively executes the process of Steps S1 to S9, and S21 described above during the combined manipulation. Accordingly, the drive control apparatus 101 according to the embodiment can cause the actual slewing acceleration of the slewing motor 11 to approach the target slewing acceleration during the combined manipulation regardless of the posture of the working device 3 and the distal end weight. Thus, the acceleration of the slewing movement of the upper slewing body 2 is compensated.

The controller 70 may control the flow rate of the hydraulic oil discharged from the first pump 21 and the flow rate of the hydraulic oil discharged from the second pump 22 on the basis of a lever manipulation amount while executing the process of Steps S1 to S9, and S21.

Next, specific exemplary operation of the slewing-type working machine 100 will be described with reference to time charts in FIG. 6.

Figure 6:
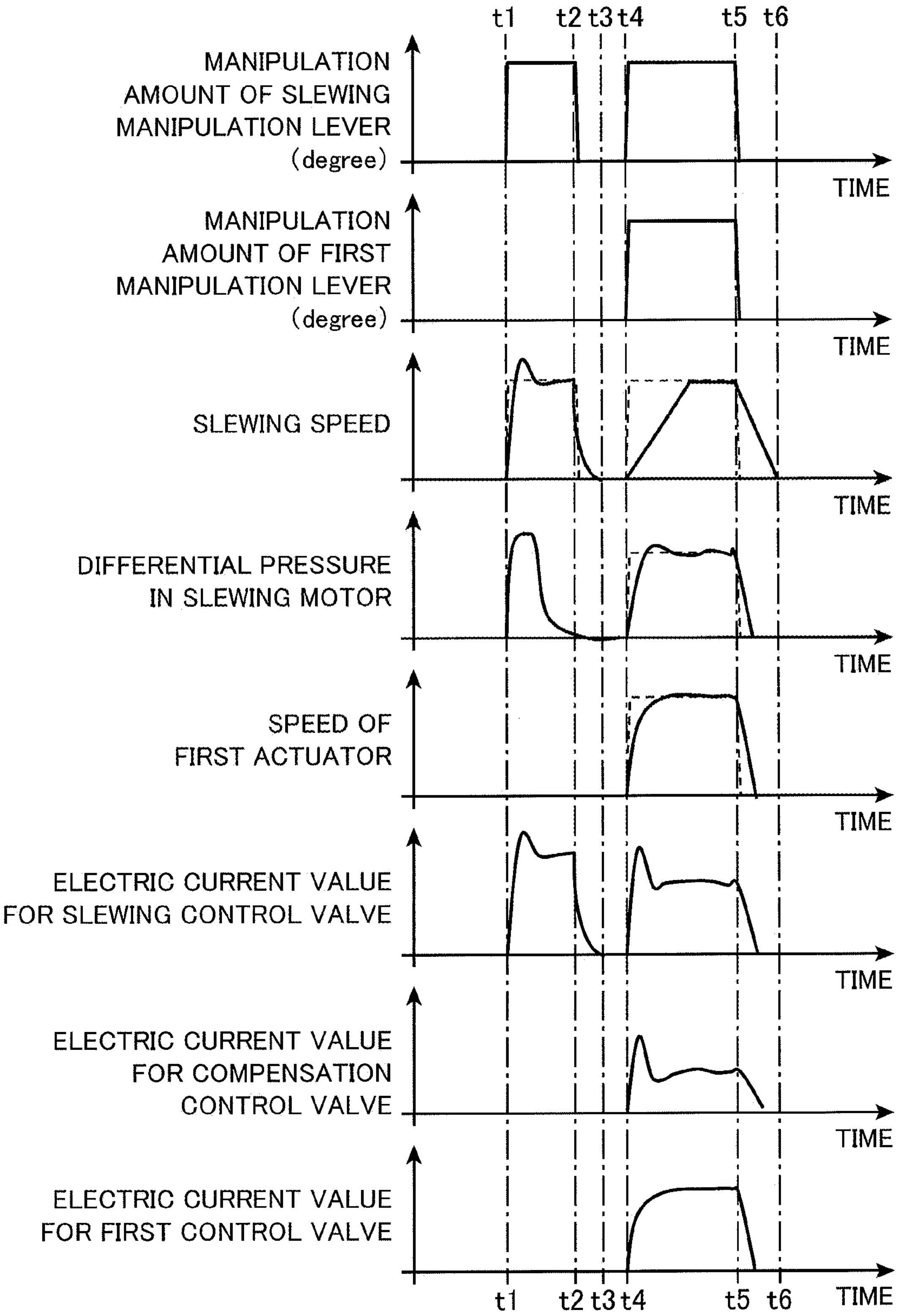
FIG. 6 shows time charts representing exemplary operation of the slewing-type working machine including the drive control apparatus according to the embodiment.

A time span before a time t1 shown in FIG. 6 includes a period of no manipulation during which the manipulation levers of the manipulation devices receive no manipulation. In the period of no manipulation, the controller 70 does not execute control for actuating the upper slewing body 2 and the working device 3.

A time span from the time t1 to a time t3 shown in FIG. 6 includes a period of only slewing manipulation during which the manipulation lever 42A of the slewing manipulation device 42 receives the slewing manipulation as shown in the graph on the top in FIG. 6, but the manipulation lever 41A of the boom manipulation device 41 does not receive the boom manipulation (exemplary first manipulation) as shown in the second graph from the top in FIG. 6. A time span from the time t1 to a time t2 shown in FIG. 6 includes a period during which the lever manipulation amount of the slewing manipulation increases and a period during which the lever manipulation amount is kept at a certain value (e.g., a maximum value), and a time span from the time t2 to the time t3 includes a period during which the lever manipulation amount of the slewing manipulation decreases and a period during which the lever manipulation amount is kept at zero. In the period of only slewing manipulation, no hydraulic interference due to a combined manipulation including the slewing manipulation and the boom manipulation occurs. Therefore, the controller 70 executes the slewing speed FB control that is a feedback control for adjusting the opening degree of the slewing control valve 32 to cause the actual slewing speed to approach the target slewing speed.

Specifically, as described above, in the period of only slewing manipulation, the controller 70 determines the target slewing speed on the basis of the lever manipulation amount of the slewing manipulation received by the manipulation lever 42A of the slewing manipulation device 42 and the map shown in FIG. 4, and acquires the actual slewing speed at the certain time on the basis of the detection signal input from the slewing speed detector 62. The controller 70 then determines the slewing control instruction for the slewing proportional valve 52 such that the slewing speed error between the target slewing speed and the actual slewing speed approaches zero, and inputs the determined slewing control instruction to the slewing proportional valve 52.

In the time span from the time t1 to the time t3 including the period of only slewing manipulation, the target slewing speed is shown by a broken line in the third graph from the top in FIG. 6, the actual slewing speed is shown by a solid line in the third graph from the top in FIG. 6, and the slewing control instruction (electric current value for the slewing control valve 32) is shown by a solid line in the sixth graph from the top in FIG. 6. The slewing speed FB control as described above is executed during only the slewing manipulation, so that the actual slewing speed is adjusted to a magnitude close to the target slewing speed as shown in the third graph from the top in FIG. 6.

In the case where only the slewing manipulation is performed, the controller 70 preferably inputs an instruction to a proportional valve 55 so that the slewing torque is compensated by a bleed-off valve 35 (see FIG. 2). Specifically, the bleed-off valve 35 is, e.g., a two-position pilot selector valve having a pilot port. The bleed-off valve 35 is configured to be kept at a valve closing position to block a bleed-off passage 36 when no pilot pressure from the pilot pump 24 is provided to the pilot port, and be opened according to the pilot pressure provided to the pilot port. The proportional valve 55 is opened by receiving an instruction from the controller 70 as an input, and allows provision of pilot pressure in proportion to the instruction to the pilot port of the bleed-off valve 35. During only the slewing manipulation, all of the hydraulic oil discharged from the second pump 22 flows to the slewing motor 11, so that the slewing motor 11 is actuated. During only the slewing manipulation, preferably, the controller 70 adjusts pressure in a passage between the second pump 22 and the slewing motor 11 by adjusting the opening degree of the bleed-off valve 35 to release a part of the hydraulic oil to a tank through the bleed-off valve 35, and thus compensates the slewing torque (acceleration). Preferably, the bleed-off valve 35 is fully closed during the combined manipulation.

A time span from a time t4 to a time t6 shown in FIG. 6 includes a period of a combined manipulation including a slewing manipulation and a boom manipulation (exemplary first manipulation), as shown in the graph on the top and the second graph from the top in FIG. 6. A time span from the time t4 to a time t5 shown in FIG. 6 includes a period during which the lever manipulation amount of the slewing manipulation increases and a period during which the lever manipulation amount is kept at a certain value (e.g., a maximum value), and a time span from the time t5 to the time t6 includes a period during which the lever manipulation amount of the slewing manipulation decreases and a period during which the lever manipulation amount is kept at zero. In the period of the combined manipulation, the controller 70 compensates the acceleration of the slewing movement of the slewing motor 11 by executing the slewing acceleration FB control described above.

In the time span from the time t4 to the time to including the period of the combined manipulation, the target slewing differential pressure (P) is shown by a broken line in the fourth graph from the top in FIG. 6, and the actual slewing differential pressure is shown by a solid line in the fourth graph from the top in FIG. 6. In the time span from the time t4 to the time t6, the slewing control instruction (electric current value) is shown by a solid line in the sixth graph from the top in FIG. 6, the compensation control instruction (electric current value) is shown by a solid line in the seventh graph from the top in FIG. 6, and a boom control instruction (electric current value) being a control instruction to the boom proportional valve 51 is shown by a solid line in the graph on the bottom in FIG. 6.

The slewing acceleration FB control as described above is executed during the combined manipulation, so that the slewing differential pressure in the slewing motor is adjusted to a magnitude close to the target slewing differential pressure as shown in the fourth graph from the top in FIG. 6. Thus, the acceleration of the rotation body is adjusted to a substantially constant value as shown by the solid line in the third graph from the top in FIG. 6.

Figure 7:
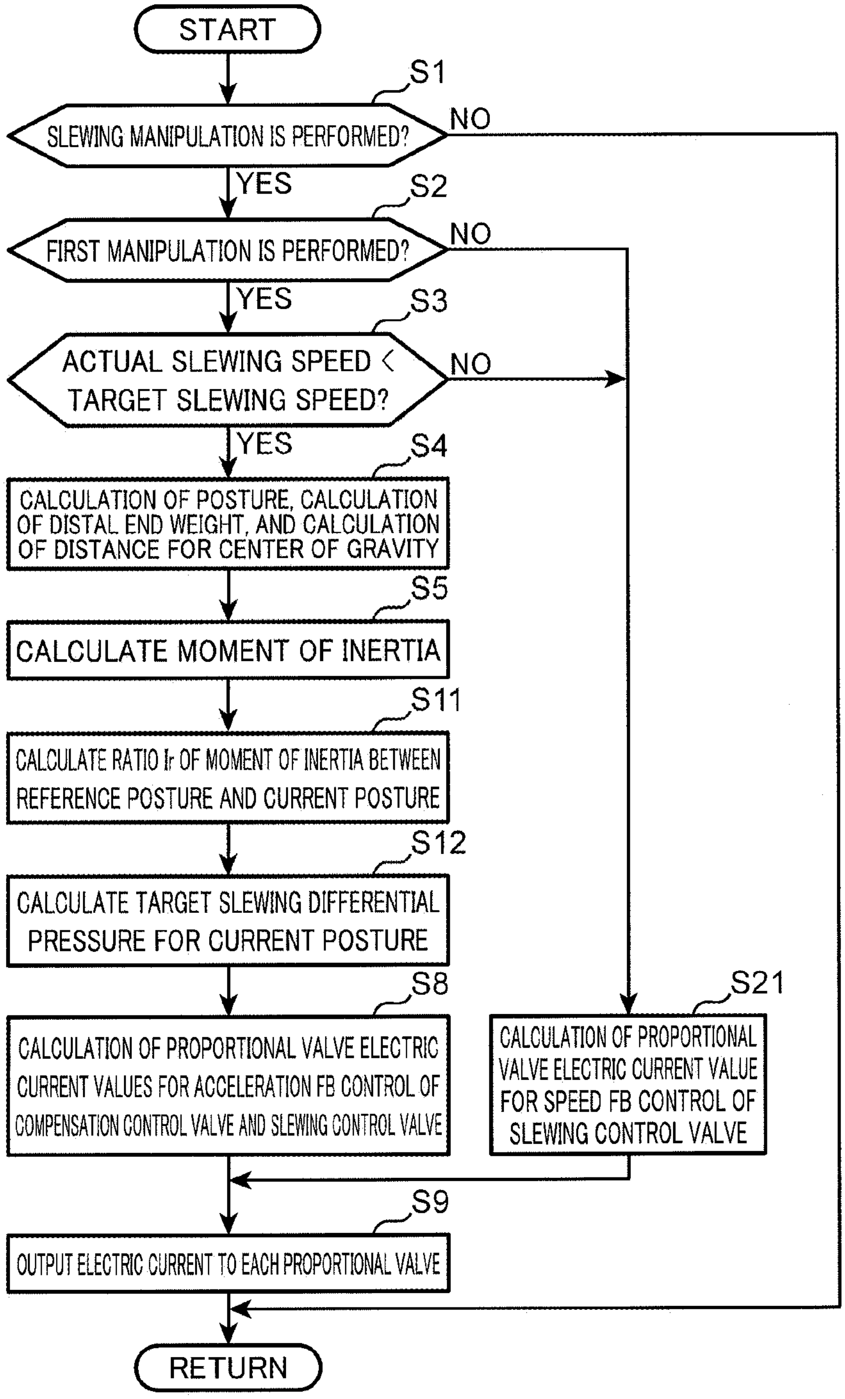
FIG. 7 is a flowchart illustrating an exemplary calculation process executed by the controller of the drive control apparatus according to a modification of the embodiment.

FIG. 7 is a flowchart illustrating an exemplary calculation process executed by the controller 70 of the drive control apparatus 101 according to a modification of the embodiment. The calculation process shown in FIG. 7 is different from the calculation process shown in FIG. 3 in how the target slewing differential pressure is calculated.

In the embodiment shown in FIG. 3, the target slewing torque (T) is calculated by using the target slewing acceleration determined according to the lever manipulation amount of the slewing manipulation (Step S6 in FIG. 3), and the target slewing differential pressure (P) is calculated by using the calculated target slewing torque (T) (Step S7). On the other hand, the calculation process according to the modification shown in FIG. 7 includes a procedure of Steps S11 and S12 in FIG. 7 instead of the procedure of Steps S6 and S7 in FIG. 3.

In this modification, in Step S11, the controller 70 calculates a ratio (Ir) of moment of inertia between a reference posture and a current posture. In Step S12, the controller 70 calculates a target slewing differential pressure (Pr) for the current posture by using a target slewing differential pressure reference value (P0) and the equation "Pr=Ir×P0". The target slewing differential pressure reference value (P0) is a target slewing differential pressure for the reference posture, which is preset and stored in the controller 70. The ratio (Ir) of moment of inertia indicates a ratio between a moment of inertia for the predetermined reference posture and a moment of inertia for the current posture (Ir=Moment of Inertia for Current Posture/Moment of Inertia for Reference Posture). The moment of inertia for the reference posture is prestored in the controller 70. The moment of inertia for the current posture is calculated as described above, in Steps S4 and S5 in FIG. 3. A higher moment of inertia requires a higher slewing torque (differential pressure). Therefore, in an exemplary case where the moment of inertia for the current posture is higher than the moment of inertia for the reference posture, the ratio (Ir) of moment of inertia becomes higher than 1 and the target slewing differential pressure (Pr) becomes higher than the target slewing differential pressure reference value (P0).

As described above, the slewing differential pressure is proportional to the moment of inertia in the case where the slewing motor equivalent capacity and the target slewing acceleration are constant values. Therefore, the controller 70 can calculate the target slewing differential pressure (Pr) for the current posture by using the equation described above "Pr=Ir×P0", when the target slewing differential pressure reference value (P0) and the ratio (Ir) of moment of inertia between the reference posture and the current posture are determined. The controller 70 can calculate the required target slewing differential pressure (Pr) in the current posture by executing the calculation process as described above.

The description of the procedure of Steps S1 to S5, and Steps S8, S9, and S21 in the flowchart in FIG. 7, which are similar to the procedure of Steps S1 to S5, and Steps S8, S9, and S21 in the flowchart shown in FIG. 3, will be omitted.

Modifications

A slewing-type working machine according to the embodiment of the present disclosure is described above, but the present disclosure is not limited to the embodiment and includes, e.g., the modifications described below.

(A) Target Slewing Acceleration

In the embodiment, the controller 70 determines a target slewing acceleration on the basis of a lever manipulation amount of a slewing manipulation at a certain time and the map exemplified in FIG. 5. The way of determining the target slewing acceleration according to the manipulation amount of the slewing manipulation is not limited to the specific example described above. For example, the controller 70 may determine the target slewing acceleration on the basis of a lever manipulation amount of a slewing manipulation at a certain time and a preset relational expression. The map shown in FIG. 5 indicates such a characteristic that the target slewing acceleration is proportional to the lever manipulation amount, but the characteristic of the map for the determination of the target slewing acceleration is not limited to that shown in FIG. 5; for example, the map may have such a characteristic that the target slewing acceleration increases curvilinearly as the lever manipulation amount increases, or such a characteristic that the target slewing acceleration increases as the lever manipulation amount increases until the lever manipulation amount reaches a specific value, and the target slewing acceleration takes a constant value when the lever manipulation amount exceeds the specific value.

(B) Target Slewing Torque Relevant Value and Actual Slewing Torque Relevant Value In the embodiment, the target slewing torque relevant value is a target slewing differential pressure that is a target of the slewing differential pressure, and the actual slewing torque relevant value is the slewing differential pressure detected by the differential pressure detector, but the values are not limited to the specific examples. The target slewing torque relevant value in the present disclosure may be the target slewing torque calculated by using the moment of inertia relevant to the slewing movement and the target slewing acceleration; in this case, the actual slewing torque relevant value in the present disclosure may be the actual slewing torque. Alternatively, the target slewing torque relevant value may be another physical quantity relevant to the target slewing torque, and the actual slewing torque relevant value may be another physical quantity relevant to the actual slewing torque.

(C) Combined Manipulation

In the embodiment, the controller 70 executes the slewing acceleration FB control during a combined manipulation including a boom manipulation and a slewing manipulation. The boom manipulation is the boom raising manipulation, or may be the boom lowering manipulation. In the present disclosure, the controller may execute the slewing acceleration FB control during a combined manipulation including an arm manipulation (arm pushing manipulation or arm pulling manipulation) and the slewing manipulation, or including a bucket manipulation and the slewing manipulation.

(D) First Movable Part, First Actuator. First Manipulation Device, First Manipulation, and First Control Valve In the embodiment, the boom 4 corresponds to the first movable part; the boom cylinder 7 corresponds to the first actuator; the boom manipulation device corresponds to the first manipulation device; the boom manipulation corresponds to the first manipulation; and the boom control valve corresponds to the first control valve, but these are not limited to the specific examples as described above. The first movable part in the present disclosure may be an arm or a bucket; in this case, the first actuator may be an arm cylinder 8 or a bucket cylinder 9, the first manipulation device may be an arm manipulation device or a bucket manipulation device, the first manipulation may be an arm manipulation (arm pushing manipulation or arm pulling manipulation) or a bucket manipulation, and the first control valve may be an arm control valve or a bucket control valve, respectively. In a case where the working device includes another leading end attachment such as a grapple, a fork, and a crusher instead of the bucket, the first movable part in the present disclosure may be the leading end attachment, the first actuator may be a hydraulic actuator for actuating the leading end attachment, the first manipulation may be a manipulation for actuating the hydraulic actuator, the first manipulation device may be one that receives the first manipulation, and the first control valve may be a control valve that has an adjustable opening degree for changing a flow rate of hydraulic oil to be supplied from the other hydraulic pump to the hydraulic actuator.

(E) Hydraulic Pump

The drive control apparatus according to the embodiment includes the first pump 21 and the second pump 22; in this regard, the drive control apparatus may not include the first pump 21 while including the second pump 22.

(F) Controller

In the embodiment, during the combined manipulation, the controller 70 calculates the target slewing torque relevant value relevant to the target slewing torque by using the target slewing acceleration and the moment of inertia around the slewing axis of the rotation body, and adjusts the opening degree of the compensation control valve to cause an error between the target slewing torque relevant value and an actual slewing torque relevant value relevant to an actual slewing torque to approach zero, but the configuration is not limited to the specific example. For example, the controller 70 may adjust, during the combined manipulation, the opening degree of the compensation control valve to cause the error between the target slewing acceleration according to the manipulation amount of the slewing manipulation and the actual slewing acceleration to approach zero. In this exemplary case, the controller can calculate the actual slewing acceleration by differentiating the movement speed of the slewing motor 11 detected by the slewing speed detector 62 or a speed correlating this movement speed with time. In a case where the drive control apparatus 101 includes an unillustrated torque sensor, the controller 70 may calculate the actual slewing acceleration by using the detected torque and the moment of inertia.

In the embodiment, the controller 70 calculates the target slewing torque relevant value by using the moment of inertia and the target slewing acceleration during the combined manipulation. Specifically, in the embodiment, the controller 70 adjusts the opening degree of the compensation control valve to cause an error between the actual slewing torque relevant value and the target slewing torque relevant value resulting from a correction of the target slewing acceleration with the moment of inertia to approach zero, but the configuration is not limited to this specific example. The controller in the present disclosure may adjust, during the combined manipulation, the opening degree of the compensation control valve to cause the error between the target slewing acceleration and the actual slewing acceleration to approach zero without the correction of the target slewing acceleration with the moment of inertia.

In the embodiment, the controller 70 adjusts the opening degree of the slewing control valve to cause the actual slewing acceleration to reach the target slewing acceleration during the combined manipulation. In this regard, the adjustment of the opening degree of the slewing control valve during the combined manipulation may be omitted.

(G) Moment of Inertia

In the embodiment, the moment (I) of inertia around the slewing axis Z is calculated by using the equation "$I=mr^2$" described above. However, the way of calculating (the equation for calculating) the moment of inertia is not limited to the specific example described in the embodiment.

As described above, the present disclosure enables provision of a drive control apparatus for a slewing-type working machine that enables adjustment of a slewing acceleration to a target slewing acceleration according to a manipulation amount of a slewing manipulation even in a case where a hydraulic pump is utilized for both a slewing motor and a first actuator and a combined manipulation for actuating the actuators is performed.

Provided is a drive control apparatus for a slewing-type working machine that includes: a hydraulic pump; a slewing motor that slews an upper slewing body supporting a working device having a first movable part; a first actuator that moves the first movable part; a slewing control valve between the hydraulic pump and the slewing motor that has an adjustable opening degree for changing a flow rate of hydraulic oil to be supplied from the hydraulic pump to the slewing motor; a compensation control valve between the hydraulic pump and the first actuator that has an adjustable opening degree for changing a flow rate of hydraulic oil to be supplied from the hydraulic pump to the first actuator; a slewing manipulation device that receives a slewing manipulation for actuating the slewing motor; a first manipulation device that receives a first manipulation for actuating the first actuator; and a controller that adjusts, during a combined manipulation of the first manipulation and the slewing manipulation, the opening degree of the compensation control valve to cause an actual slewing acceleration to reach a target slewing acceleration according to a manipulation amount of the slewing manipulation.

In the drive control apparatus, the controller adjusts the opening degree of the compensation control valve during the combined manipulation to adjust upstream pressure of the compensation control valve, so that a slewing torque required for adjusting the actual slewing acceleration to the target slewing acceleration can be generated regardless of the actuation pressure for the first actuator during the combined manipulation. Accordingly, the drive control apparatus enables control for causing the actual slewing acceleration to reach the target slewing acceleration according to the manipulation amount of the slewing manipulation even in a case where the hydraulic pump is utilized for both the slewing motor and the first actuator and the combined manipulation for actuating both is performed.

Preferably, during the combined manipulation, the controller calculates a target slewing torque relevant value relevant to a target slewing torque by using the target slewing acceleration and a moment of inertia around a slewing axis of a rotation body including the upper slewing body and the working device, and adjusts the opening degree of the compensation control valve to cause an error between the target slewing torque relevant value and an actual slewing torque relevant value relevant to an actual slewing torque to approach zero. The moment of inertia around the slewing axis of the rotation body including the upper slewing body and the working device changes according to the posture of the working device including the first movable part. Thus, in this configuration, the controller calculates the target slewing torque relevant value by using the moment of inertia and the target slewing acceleration, and adjusts the opening degree of the compensation control valve to cause the error between the target slewing torque relevant value and the actual slewing torque relevant value to approach zero. Accordingly, the actual slewing acceleration can be controlled more precisely to reach the target slewing acceleration according to the manipulation amount of the slewing manipulation, regardless of the posture of the working device.

Preferably, the drive control apparatus further includes a differential pressure detector that detects slewing differential pressure between meter-in pressure and meter-out pressure of the slewing motor; the target slewing torque relevant value is a target slewing differential pressure that is a target of the slewing differential pressure; and the actual slewing torque relevant value is the slewing differential pressure detected by the differential pressure detector. In this configuration, the slewing torque required for the control for causing the actual slewing acceleration to reach the target slewing acceleration can be generated by causing the slewing differential pressure detectable by the differential pressure detector to approach the target slewing differential pressure.

Preferably, the controller adjusts the opening degree of the slewing control valve to cause the actual slewing acceleration to reach the target slewing acceleration during the combined manipulation. In this configuration, both the opening degree of the compensation control valve and the opening degree of the slewing control valve are adjusted to adjust the slewing acceleration during the combined manipulation. Thus, the slewing acceleration can be controlled much more precisely to reach the target slewing acceleration according to the manipulation amount of the slewing manipulation.

Provided is a slewing-type working machine that includes the drive control apparatus, the working device having the first movable part, and the upper slewing body. In the slewing-type working machine, a slewing acceleration is adjusted to a target slewing acceleration according to a manipulation amount of a slewing manipulation even in a case where a hydraulic pump is utilized for both a slewing motor and a first actuator and a combined manipulation for actuating both is performed.

The invention claimed is:

1. A drive control apparatus for a slewing-type working machine, comprising:
- a hydraulic pump;
- a slewing motor that slews an upper slewing body supporting a working device having a first movable part;
- a first actuator that moves the first movable part;
- a slewing control valve between the hydraulic pump and the slewing motor that has an adjustable opening degree for changing a flow rate of hydraulic oil to be supplied from the hydraulic pump to the slewing motor;
- a compensation control valve between the hydraulic pump and the first actuator that has an adjustable opening degree for changing a flow rate of hydraulic oil to be supplied from the hydraulic pump to the first actuator;
- a slewing manipulation device that receives a slewing manipulation for actuating the slewing motor;
- a first manipulation device that receives a first manipulation for actuating the first actuator; and
- a controller that adjusts, during a combined manipulation of the first manipulation and the slewing manipulation, the opening degree of the compensation control valve to cause an actual slewing acceleration to reach a target slewing acceleration according to a manipulation amount of the slewing manipulation,
- wherein, during the combined manipulation, the controller calculates a target slewing torque relevant value relevant to a target slewing torque by using the target slewing acceleration and a moment of inertia around a slewing axis of a rotation body including the upper slewing body and the working device, and adjusts the opening degree of the compensation control valve to cause an error between the target slewing torque relevant value and an actual slewing torque relevant value relevant to an actual slewing torque to approach zero.

2. The drive control apparatus for the slewing-type working machine according to claim 1, further comprising:
- a differential pressure detector that detects slewing differential pressure between meter-in pressure and meter-out pressure of the slewing motor, wherein
- the target slewing torque relevant value is a target slewing differential pressure that is a target of the slewing differential pressure, and
- the actual slewing torque relevant value is the slewing differential pressure detected by the differential pressure detector.

3. A slewing-type working machine comprising:
- the drive control apparatus according to claim 1;
- the working device having the first movable part; and
- the upper slewing body.

4. A drive control apparatus for a slewing-type working machine comprising:

a hydraulic pump;

a slewing motor that slews an upper slewing body supporting a working device having a first movable part;

a first actuator that moves the first movable part;

a slewing control valve between the hydraulic pump and the slewing motor that has an adjustable opening degree for changing a flow rate of hydraulic oil to be supplied from the hydraulic pump to the slewing motor;

a compensation control valve between the hydraulic pump and the first actuator that has an adjustable opening degree for changing a flow rate of hydraulic oil to be supplied from the hydraulic pump to the first actuator;

a slewing manipulation device that receives a slewing manipulation for actuating the slewing motor;

a first manipulation device that receives a first manipulation for actuating the first actuator; and a controller that adjusts, during a combined manipulation of the first manipulation and the slewing manipulation, the opening degree of the compensation control valve to cause an actual slewing acceleration to reach a target slewing acceleration according to a manipulation amount of the slewing manipulation, wherein the controller adjusts the opening degree of the slewing control valve to cause the actual slewing acceleration to reach the target slewing acceleration during the combined manipulation.

* * * * *